Feb. 21, 1967 M. W. STUART 3,304,778
WIND VELOCITY SENSOR FOR SAILBOAT
Filed Oct. 28, 1963 2 Sheets-Sheet 1
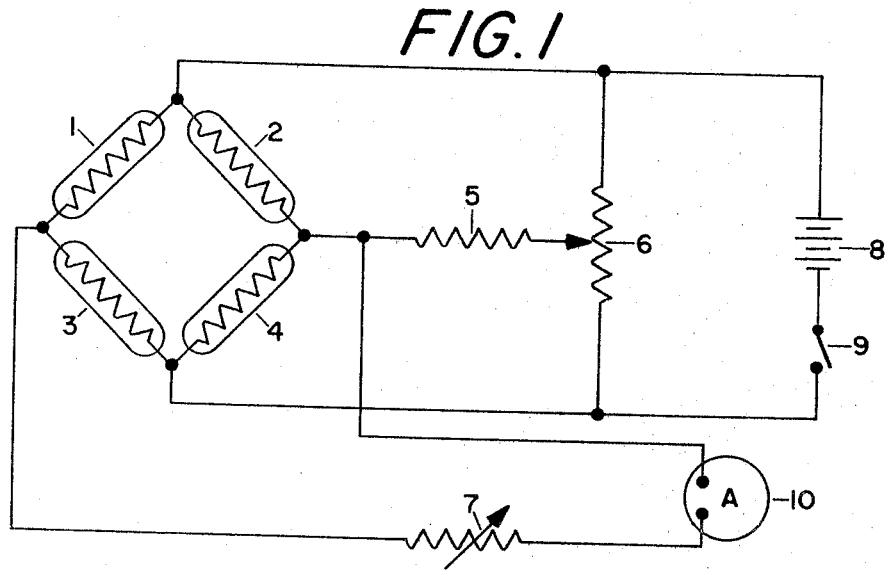
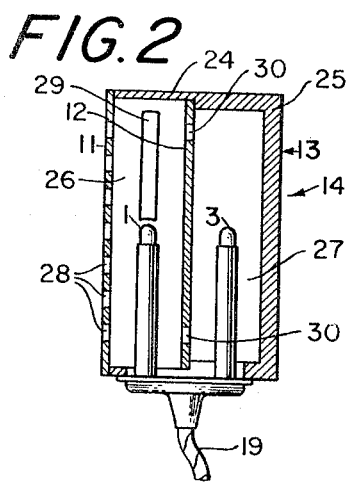
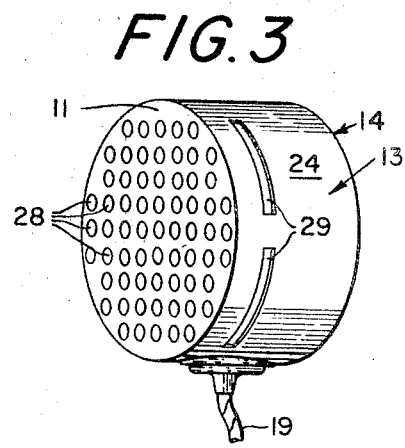
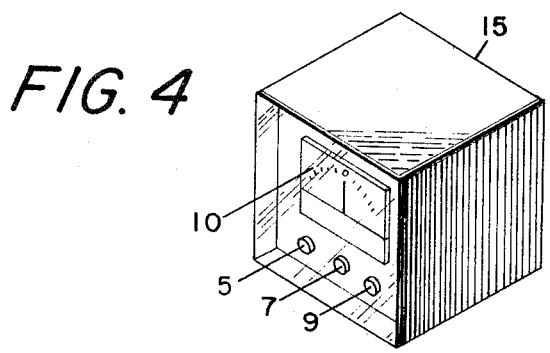

Feb. 21, 1967   M. W. STUART   3,304,778
WIND VELOCITY SENSOR FOR SAILBOAT
Filed Oct. 28, 1963
2 Sheets-Sheet 2

United States Patent Office 3,304,778
Patented Feb. 21, 1967

3,304,778
WIND VELOCITY SENSOR FOR SAILBOAT
Marvin Wooten Stuart, Box 188,
Russellville, Ky. 42276
Filed Oct. 28, 1963, Ser. No. 319,608
3 Claims. (Cl. 73—189)

This invention relates to a wind velocity sensor, and more particularly to a wind velocity sensor fixed to the sail of a sailboat.

One object of this invention is to provide a wind velocity sensor fixed to the mainsail of a sailboat at the "maximum point of effort" and means for indicating the sensed velocity of the wind.

Another object of this invention is to provide a wind velocity sensor including a pair of identical transducers fixed to opposite sides of the sail of a sailboat at the maximum point of effort and means for indicating the effective wind velocity on the windward side of the sail.

Another object of this invention is to provide a wind velocity sensor for a sloop-rigged sailboat including a pair of identical transducers fixed on opposite sides of the mainsail at the maximum point of effort and means for indicating the wind velocity on both sides of the sail to facilitate setting either or both the mainsail and the jib for maximum efficiency.

A further object of this invention is to provide a wind velocity sensor fixed to the sail of a sailboat and connected to means on the sailboat indicating to the sailor any adjustments required in the sails for obtaining the maximum efficeincy and speed of the boat.

Another object of this invention is to provide a wind velocity sensor for a sailboat having a transducer, including a bridge-connected, wind-temperature sensing thermistor exposed to the windward side of the sail and a reference thermistor sheltered from the force of the wind and exposed only to its ambient air temperature, for producing an electrical signal proportionate to the wind velocity, and means for indicating the electrical signal.

The transducer of the wind velocity sensor which is affixed to the mainsail, consists of a main shell having a perforated cover and a center partition which is only slightly perforated. The case contains slotted apertures in the front section of the transducer only, thereby allowing air to pass through the perforated face plate and out the case sides unhindered. Perforations between the front and rear sections of the transducer in the center plate allow the ambient air to enter the rear section, but will stagnate because of lack of air holes. The transducer on the windward side of the mainsail will therefore be cooled by the motion of the air entering the transducer relative to the air velocity and the thermistor in the rear section of the transducer will measure the ambient air temperature.

One transducer on the port side of the mainsail will consist of a measuring thermistor and a reference thermistor connected in a bridge with the reference thermistor and measuring thermistor of an identical transducer on the starboard side of the mainsail. This bridge is excited from a battery through a power switch, and the bridge unbalance will produce a current through a span adjusting resistor and actuate the meter. A zero adjust resistor will provide current through another resistor to provide a zero meter reading from a zero differential.

The indicator and power pack unit will house the battery, output meter, zero-adjust resistor, span resistor and power switch.

Further objects and advantages of the invention will be apparent from the following description taken in conjunction with the drawings, wherein:

FIG. 1 is an electrical circuit diagram of the invention incorporating two transducers, FIG. 2 is a sectional elevation of one of the transducers;

FIG. 3 is a perspective view of the transducer disclosed in FIG. 2;

FIG. 4 is a perspective view of the indicator and power pack unit; and

Figure 5:
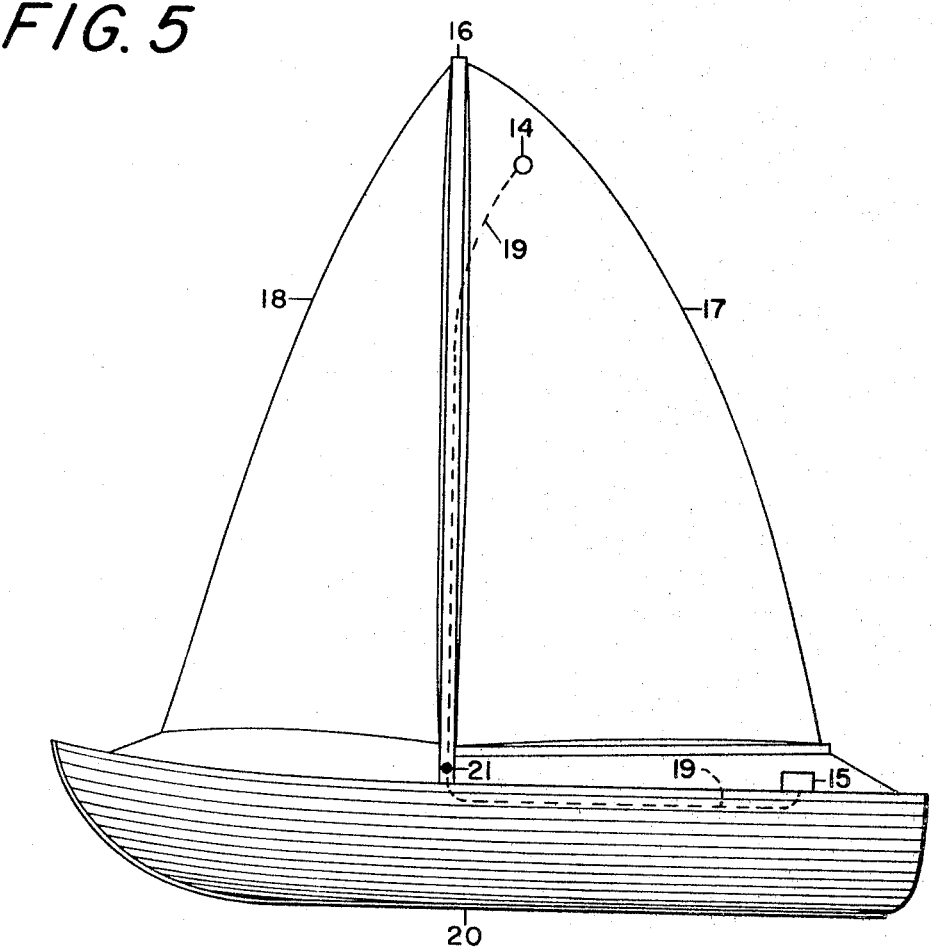
FIG. 5 is a port side elevation of a sloop-rigged sailboat incorporating the invention.

Referring now to the drawings in more detail, FIG. 1 disclosed an electrical circuit diagram for a wind velocity sensor incorporating two identical transducers adapted to be fixed on opposite sides of and at the maximum point of effort on the mainsail 17. Although only one transducer 14 is disclosed in FIGS. 2 and 3, and in FIG. 5 fixed on the port side of the mainsail 17, it will be understood that an identical transducer, not shown, will also be fixed on the starboard side of the mainsail 17 opposing the transducer 14, and both the port transducer 14 and the starboard transducer will be located at the maximum point of effort of the mainsail 17.

The port transducer 14 includes a measuring or sensing element, such as thermistor 1, and a reference element, such as thermistor 3, in an electrical bridge circuit. In this embodiment of the invention, the sensing element, such as thermistor 4, and the reference element, such as thermistor 2, of the starboard transducer are also connected in the same bridge circuit as thermistors 1 and 3, as disclosed in FIG. 1.

Bridge 1–4 is excited by battery 8 through closed power switch 9, and the bridge unbalance will produce a current through the span adjusting resistor 7 to actuate the indicator meter 10. A zero-adjust resistor 6, connected in parallel with the battery 8 and power switch 9, will produce a current through resistive wiper 5 to provide a zero reading in the meter 10 when the wiper 5 is adjusted to produce a zero voltage differential.

Port transducer 14 disclosed in FIGS. 2 and 3 includes a main shell or case 13, disclosed in the drawings as having a cylindrical side wall 24, a closed end wall 25, and an opposite open end closed by the cover 11. The interior of the shell 13 is divided into a front section or chamber 26 and a rear section or chamber 27 by the intermediate partition 12, which is disclosed parallel between the end wall 25 and the cover 11. The cover 11 is perforated with numerous openings 28 to permit entrance of the wind into the front chamber 26 without substantially affecting the wind velocity. The rapidly moving air is then discharged through the circumferentially spaced slots 29 in the wall 24 from the front chamber 26. However, the intermediate partition 12 is also slightly perforated with a few holes 30 to permit the passage of air from the front chamber 26 into the rear chamber 27. However, since the ambient air in rear chamber 27 is substantially confined because of the limited number of holes 30 available for ingress or egress, the wind velocity in rear chamber 27 is approximately zero.

The measuring thermistor 1 is fixed in the front chamber 26 so that it not only senses the ambient temperature of the wind, but also senses the reduction in the temperature created by the cooling effect of the wind. Since the temperature differential is a function of the wind-velocity, the electrical signal produced by thermistor 1 is also a function of the wind velocity. On the other hand, the reference thermistor 3 is fixed within the rear chamber 27, where it is protected as much as possible from the velocity of the wind, yet is subjected to its ambient temperature. Since the thermistor 3 is connected to the same bridge as the thermistor 1, the ambient temperature of the air is the reference point, and the electrical signal transmitted through the cable 19 is truly proportional to, or at least a function of, the velocity of the wind-force on the port side of the mainsail 17 and will be so indicated on the meter 10. In an identical manner, the starboard transducer, not shown, including the measuring thermistor 4 and the reference thermistor 2, also transmits a differential electrical signal through the cable 19 to the meter 10, to indicate the value of the wind velocity on the starboard side of the mainsail 17.

Therefore, if the port side of the mainsail 17 is the windward side, the wind velocity on the port side will be greater than the wind velocity on the starboard side, and this wind velocity differential between both sides of the mainsail 17 will be indicated. On the other hand, if the starboard side of the mainsail 17 is the windward side, then the needle on the meter 10 will swing to the opposite side of the zero-reference to indicate the stronger wind velocity on the starboard side of the boat. In other words, the indicator needle on the meter 10 not only indicates the net or effective wind velocity acting upon the mainsail 17, but depending upon which side of the zero reference the indicator needle swings, also indicates the windward and lee sides of the boat. For example, if the power pack unit 15 (FIGS. 4 and 5) were located below deck, an observer could tell from the meter 10 alone whether the boat was on a starboard or a port tack.

The end wall 25 of the port transducer 14 is fixed in any convenient manner, such as by adhesive, snap fasteners or other appropriate means to the port side of the mainsail 17 at the maximum point of effort, as shown in FIG. 5.

The power pack unit 15, disclosed in FIGS. 4 and 5, houses the meter 10, the battery 8, the power switch 9, the zero-adjust resistor 6, wiper 5, and the span adjusting resistor 7.

As disclosed in FIG. 5, the power pack unit 15 is located somewhere on the hull 20 of the boat accessible to the sailor or operator of the boat for immediate visual inspection. The power pack unit 15 is connected to the port transducer 14 and the starboard transducer, not shown, by the cable 19 which extends downwardly along the mast 16 to a cable coupling or connector 21, then extends to the power pack unit 15. The cable connector 21 may be of any convenient type to permit disconnection of the cable sections 19 when the boat is docked, and the power pack unit 15 is removed, and also when it is desired to remove the mast 16 from the hull 20.

As previously noted, the sailboat disclosed in FIG. 5 is sloop-rigged, having a jib 18, as well as the mainsail 17. Since the wind velocity sensor includes a port transducer 14 and a starboard transducer on opposite sides of the mainsail 17, whichever transducer is on the lee side of the mainsail, will be sensitive to the air passing through the slot between the lee side of the mainsail 17 and the windward side of the jib 18. If the jib 18 is set too close to the mainsail 17, an increased Venturi effect will cause the lee transducer to sense an increased velocity, and therefore a reduced velocity differential between the opposite sides of the mainsail 17 will register on the meter 10. Thus, the sailor will have a choice of resetting the mainsail 17, or the jib 18, to open the slot between the jib 18 and the mainsail 17, whichever operation is appropriate.

Since the meter 10 indicates the resultant differential wind velocity acting at the maximum point of effort on the mainsail 17, it also indicates the maximum lateral resistance of the hull 20 to the water.

It will therefore be seen that a wind velocity sensor has been devised with a sensing element located at the maximum point of effort on the sail of a sailboat and with means for immediately indicating to the sailor or operator of the boat the performance and efficiency of the boat, and whether the sail or sails are properly set for maximum efficiency and speed.

It will be understood that instead of incorporating a port transducer 14 and another identical starboard transducer, a sensing unit might be incorporated having a single unit extending through the sail with appropriate air inlets on opposite sides of the sails activating the corresponding sensing and reference elements in the same bridge circuit disclosed in FIG. 1.

It will therefore be apparent to those skilled in the art that various changes may be made in the invention without departing from the spirit and scope thereof, and therefore the invention is not limited by that which is shown in the drawings or described in the specification, but only as indicated in the appended claims.

What is claimed is:

1. A wind velocity sensor for a sailboat having a sail, comprising:
    (a) a port transducer unit fixed to the port side of said sail at the maximum point of effort and exposed to the wind,
    (b) a starboard transducer unit fixed to the starboard side of said sail at the maximum point of effort and exposed to the wind,
    (c) said transducer units being connected into an electrical bridge circuit to transmit an electrical signal which is a function of the difference in the wind velocities on both sides of said sail, and
    (d) means in said sailboat electrically connected to said bridge circuit to indicate the magnitude of said electrical signal.

2. The invention according to claim 1 in which each transducer unit includes a wind-sensing transducer element exposed to said wind and a reference transducer element exposed to said wind at substantially zero velocity.

3. The invention according to claim 2 in which each of said transducer elements comprises a thermistor.

References Cited by the Examiner

UNITED STATES PATENTS

| | | | |
|---|---|---|---|
| 2,136,991 | 11/1938 | DeBlois | 73—189 |
| 2,859,617 | 11/1958 | Adams | 73—204 |
| 2,981,104 | 4/1961 | Auger et al. | 73—189 |
| 3,157,148 | 11/1964 | Reed | 114—102 |

FOREIGN PATENTS

| | | |
|---|---|---|
| 1,238,716 | 7/1960 | France. |
| 136,041 | 12/1919 | Great Britain. |

RICHARD C. QUEISSER, *Primary Examiner.*

E. D. GILHOOLY, *Assistant Examiner.*